G. E. GILMORE.
RESILIENT WHEEL TIRE.
APPLICATION FILED JUNE 7, 1920.
1,358,308.
Patented Nov. 9, 1920.
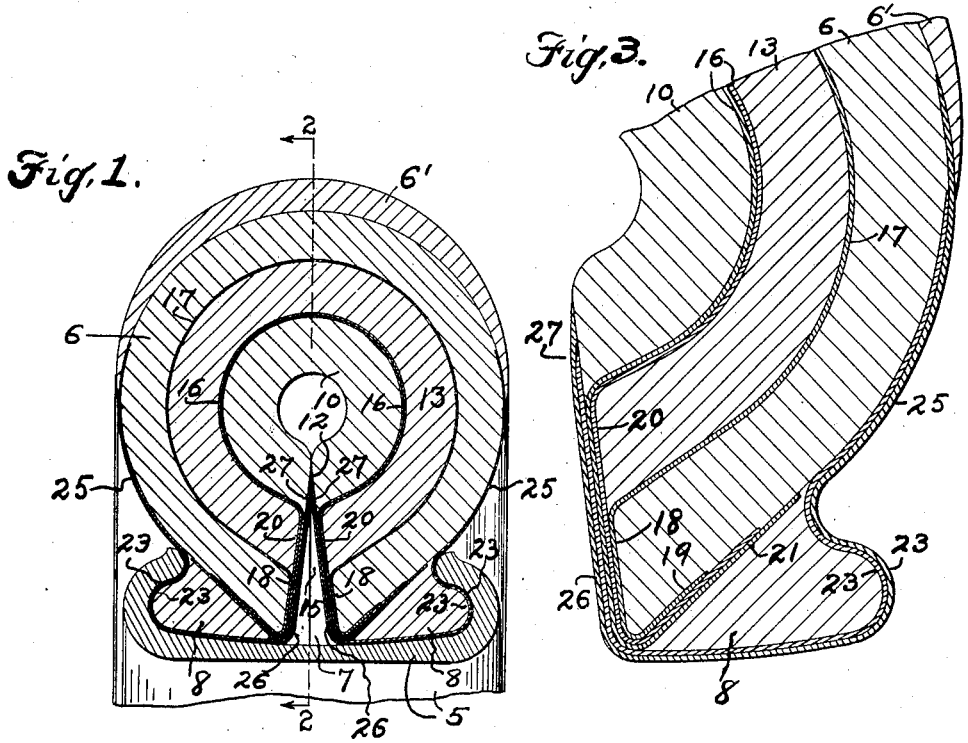
Fig. 1.
Fig. 3.
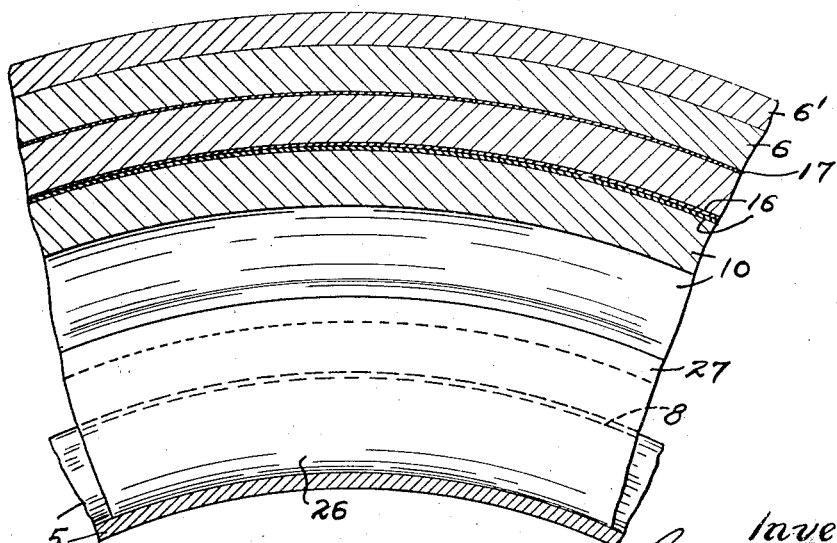
Fig. 2.
Inventor
George E. Gilmore
By
his Attorney

UNITED STATES PATENT OFFICE.

GEORGE E. GILMORE, OF CLEVELAND, OHIO.

RESILIENT WHEEL-TIRE.

1,358,308.  Specification of Letters Patent.  Patented Nov. 9, 1920.

Application filed June 7, 1920. Serial No. 386,944.

*To all whom it may concern:*

Be it known that I, GEORGE E. GILMORE, a citizen of the United States, residing at Cleveland, in the county of Cuyahoga and State of Ohio, have invented a new and useful Resilient Wheel-Tire, of which the following is a specification.

This invention relates to improvements in resilient wheel-tires, and pertains more especially to a non-inflatable and non-collapsible elastic and compressible tire which not only comprises an outer casing adapted to extend circumferentially of a wheel-rim and provided at its outer circumference with a tread and having a slot formed in its inner half centrally between the sides of the tire and dividing said half into two parts and has two external elastic and compressible beads arranged at opposite sides respectively of said slot and attached to said casing, but also comprises an elastic and compressible tubular core arranged centrally of said casing and extending circumferentially of said slot and forming the central portion of the tire and having a slot adjacent and registering with the first-mentioned slot and also has an elastic and compressible tubular inner casing extending circumferentially of and containing the core and secured to the core and embraced by and contained within and secured to the outer casing and having a slot which is formed between and registers with the aforesaid slots in the core and outer casing.

The object of this invention is to produce a readily manufactured highly resilient, strong and durable wheel-tire of the character indicated, and with this object in view, and to attain any other object hereinafter appearing, this invention consists in certain features of construction, and combinations and relative arrangements of parts, hereinafter described in this specification, pointed out in the claims, and illustrated in the accompanying drawings.

In said drawings, Figure 1 is a transverse section of a portion of my improved wheel-tire shown mounted on a wheel-rim. Fig. 2 is a central section taken along the line 2—2, Fig. 1. Fig. 3 is a sectional view illustrating a portion of Fig. 1 on a larger scale.

Referring to said drawings, 5 indicates a portion of a wheel-rim provided with a non-inflatable and non-collapsible tire embodying my invention, and said tire comprises an outer casing 6 composed of elastic and compressible material such, for instance, as rubber, and shown in Figs. 1 and 2 as extending circumferentially of said rim and provided at its outer circumference with a tread 6'. Said casing is substantially circular in cross-section and (see Fig. 1) has a slot 7 formed in the inner half of the casing centrally between the sides of the tire and dividing said half into two parts.

My improved tire also comprises two beads 8 composed of elastic and compressible material such, for instance, as rubber, and said beads are arranged at opposite sides respectively of the slot 7 and externally of the casing 6 and adapted to extend circumferentially of the wheel-rim 5. Said beads are attached to said casing as will hereinafter appear.

My improved tire also comprises a tubular core 10 which is arranged centrally of the casing 6 and extends circumferentially of the slot 7. Said core is preferably circular in cross-section and composed of elastic and compressible material such, for instance, as rubber. Said core forms the central portion of the tire and (see Fig. 1) has a slot 12 formed in the inner half of the core centrally between the sides of the tire and registering with the slot 7 in the casing 6.

My improved tire also comprises an inner casing 13 which extends circumferentially of and contains the core 10 and is preferably circular in cross-section and composed of elastic and compressible material such, for instance, as rubber. Said inner casing 13 is secured to the core 10 as will hereinafter appear and embraced by and contained within the outer casing 6 to which said inner casing is secured as will hereinafter appear. Said inner casing 13 (see Fig. 1) has a slot 15 formed in the inner half of the casing centrally between the sides of the tire and consequently formed between and registering with the slot 7 in the outer casing 6 and with the slot 12 in the core 10. Preferably each of the slots 7, 12 and 15 is gradually enlarged in width toward its outer edge, and the slot 7 in the outer casing 6 is somewhat wider than the slot 15 in the inner casing 13, and the last-mentioned slot is somewhat wider than the slot 12 in the core 10.

A flexible covering is provided for the core 10 and consists of two superposed sheets or layers 16 composed of substantially or approximately non-elastic and non-stretchable fibrous flexible fabric or material such, for instance, as sea-island cotton, and cemented or secured together in any approved manner, and said covering extends circumferentially of and embraces and is preferably cemented to the core. Said covering is embraced by the inner casing 13 which is preferably cemented to said covering. Said covering materially reinforces said inner casing and the core.

A flexible covering 17 is provided for the inner casing 13 and preferably consists of a sheet of substantially or approximately non-elastic and non-stretchable fibrous flexible fabric or material such, for instance, as sea-island cotton, and said covering 17 extends circumferentially of and embraces said inner casing. The covering 17 is embraced by the outer casing 6 and is preferably cemented to the casings 6 and 13 which are materially reinforced by said covering. The covering 17 is provided at each side wall of the slot 7 in the outer casing 6 with an extension 18 which covers and is preferably cemented to said wall and extends, as at 19, between said outer casing and the bead 8 adjacent said wall, and said extension of said covering has its portion 19 preferably cemented to said outer casing.

The first-mentioned covering comprising the substantially or approximately non-elastic and non-stretchable superposed sheets or layers 16 is provided at each side wall of the slot 15 in the inner casing 13 with an extension 20 which covers and is preferably cemented to the last-mentioned wall, and preferably said extension 20 is also cemented to the adjacent extension 18 of the covering 17 for the inner casing 13 and extends, as at 21, between the adjacent bead 8 and the outer casing 6. Each extension 20 of the covering for the core has its portion 21 which is interposed between the adjacent bead 8 and the outer casing 6 preferably cemented to said outer casing and to said bead and also cemented to the portion 19 of the adjacent extension 18 of the covering 17.

The outer side of each bead 8 has a flexible reinforcing covering which consists of two superposed sheets or layers 23 composed of substantially or approximately non-elastic and non-stretchable fibrous flexible fabric or material such, for instance, as sea-island cotton, and cemented or secured together in any approved manner, and said covering embraces said bead and has an extension 25 leading from said bead toward the outer circumference of and cemented to the outer casing 6 and has another extension 26 leading through the adjacent side of the slot 7 in the outer casing 6 and cemented to the adjacent extension 20 of the covering for the core 10 and overlapping, as at 27, the adjacent side wall of the slot 12 in the core and cemented to said wall.

By the construction hereinbefore described the hereinbefore stated object is not only successfully attained, but the reinforcing coverings are not liable to become broken or detached at any point from the parts to which they are cemented or otherwise secured.

What I claim is—

1. In a non-inflatable and non-collapsible resilient wheel-tire, an elastic and compressible tubular outer casing which is adapted to extend circumferentially of a wheel-rim and provided at its outer circumference with a tread and having a slot formed in its inner half centrally between the sides of the tire and dividing said half into two parts, two external elastic and compressible beads arranged at opposite sides respectively of said slot and attached to said casing, an elastic and compressible tubular core which is arranged centrally of said casing and extends circumferentially of said slot and forms the central portion of the tire and has a slot adjacent and registering with the first-mentioned slot, and an elastic and compressible tubular inner casing which extends circumferentially of and contains the core and is secured to the core and embraced by and contained within and secured to the outer casing and has a slot formed between and registering with the aforesaid slots in the core and outer casing and wider than the slot in the core, the slot in the outer casing being wider than the slot in the inner casing.

2. In a tire of the character indicated, an elastic outer casing which is substantially circular in cross-section and has a slot in its inner half centrally between the sides of the tire, two external beads arranged at opposite sides respectively of said slot and attached to said casing, an elastic core which is arranged centrally of said casing and substantially circular in cross-section and extends circumferentially of said slot and forms the central portion of the tire and has a slot adjacent and registering with the first-mentioned slot, a flexible covering for and extending circumferentially of and secured to the core, an elastic tubular inner casing which extends circumferentially of and contains the core and is substantially circular in cross-section and secured to said covering and embraced by and contained within the outer casing and has a slot formed between and registering with the slots in the core and outer casing, and a flexible covering for and extending circumferentially of and embracing the inner casing and arranged between and secured to the casings.

3. In a tire of the character indicated, an elastic outer casing having a slot in its inner half centrally between the sides of the tire, two external beads at opposite sides respectively of said slot, an elastic core which is arranged to form the central portion of the tire and has a slot formed in the inner half of the core and registering with the first-mentioned slot, a flexible covering embracing and secured to the core, an elastic inner casing embracing and secured to said covering and containing the core and contained within the outer casing and having a slot formed between and registering with the aforesaid slots in the core and outer casing, and a flexible covering embracing the inner casing and arranged between and secured to the casings and provided at each side wall of the slot in the outer casing with an extension which covers and is secured to said wall and extends between the outer casing and the bead adjacent said wall.

4. In a tire of the character indicated, an elastic outer casing having a slot in its inner half centrally between the sides of the tire, two external beads at opposite sides respectively of said slot, an elastic core which is arranged to form the central portion of the tire and has a slot adjacent and registering with the first-mentioned slot, a flexible covering embracing and secured to the core, an elastic inner casing embracing and secured to said covering and containing the core and contained within the outer casing and having a slot formed between and registering with the slots in the core and outer casing, and a flexible covering embracing the inner casing and arranged between and secured to the casings and provided at each side wall of the slot in the outer casing with an extension which is secured to said wall and extends between the outer casing and the bead adjacent said wall and is secured to said bead, the first-mentioned covering being provided at each side wall of the slot in the inner casing with an extension which covers the last-mentioned wall and is secured to the adjacent extension of the covering for the inner casing.

5. In a wheel-tire, an elastic outer casing having a slot in its inner half centrally between the sides of the tire, two external beads at opposite sides respectively of said slot, an elastic core which is arranged centrally of the tire and has a slot adjacent and registering with the first-mentioned slot, a flexible covering embracing and secured to the core, an elastic inner casing embracing and secured to said covering and contained within the outer casing and having a slot formed between and registering with the slots in the core and outer casing, and a flexible covering embracing the inner casing and arranged between and secured to the casings and provided at each side wall of the slot in the outer casing with an extension secured to said wall, the first-mentioned covering being provided at each side wall of the slot in the inner casing with an extension secured to the last-mentioned wall and to the adjacent extension of the covering for the inner casing and to the outer casing, and the outer side of each bead having a flexible covering which has an extension leading from said bead toward the outer circumference of and secured to the outer casing and has another extension leading through the adjacent side of the slot in the outer casing and secured to the adjacent extension of the first-mentioned covering and to the adjacent side wall of the slot in the core.

6. In a wheel-tire, an elastic outer casing having a slot in its inner half centrally between the sides of the tire, two external beads at opposite sides respectively of said slot, an elastic core which is arranged centrally of the tire and has a slot adjacent and registering with the first-mentioned slot, a flexible covering embracing and secured to the core, an elastic inner casing embracing and secured to said covering and contained within the outer casing and having a slot formed between and registering with the slots in the core and outer casing, and a flexible covering embracing the inner casing and arranged between and secured to the casings and provided at each side wall of the slot in the outer casing with an extension secured to said wall and to the adjacent bead, the first-mentioned covering being provided at each side wall of the slot in the inner casing with an extension secured to the last-mentioned wall and to the adjacent extension of the covering for the inner casing and to the adjacent bead, and the outer side of each bead having a flexible covering which has an extension leading from said bead toward the outer circumference of and secured to the outer casing and has another extension leading through the adjacent side of the slot in the outer casing and secured to the adjacent extension of the first-mentioned covering.

In testimony whereof I sign the foregoing specification this 2d day of June, 1920.

GEORGE E. GILMORE.